United States Patent [19]

Hirokawa

[11] Patent Number: 4,742,452
[45] Date of Patent: May 3, 1988

[54] COMPUTER SYSTEM INCLUDING ADDRESS DRIVEN PROGRAM INTERRUPT SYSTEM

[75] Inventor: Masayuki Hirokawa, Hyogo, Japan

[73] Assignee: Mitsubishi Denki Kabushiki Kaisha, Tokyo, Japan

[21] Appl. No.: 904,838

[22] Filed: Sep. 9, 1986

Related U.S. Application Data

[63] Continuation of Ser. No. 493,485, May 11, 1983, abandoned.

[30] Foreign Application Priority Data

May 12, 1982 [JP] Japan .................................. 57-81981

[51] Int. Cl.⁴ ................................................. G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,551,895 | 12/1970 | Driscoll | 364/200 |
| 3,909,802 | 9/1975 | Cassarino et al. | 364/200 |
| 4,003,033 | 1/1977 | O'Keefe et al. | 364/200 |
| 4,038,643 | 7/1977 | Kim | 364/200 |
| 4,099,230 | 7/1978 | Mead | 364/200 |
| 4,179,731 | 12/1979 | Yamazaki | 364/200 |
| 4,179,737 | 12/1979 | Kim | 364/200 |
| 4,245,304 | 1/1981 | Porter et al. | 364/200 |

Primary Examiner—David Y. Eng
Attorney, Agent, or Firm—Sughrue, Mion, Zinn, Macpeak, and Seas

[57] ABSTRACT

A computer system, such as a microprocessor-based computer system, which includes a program supervisory device for interrupting operations of the central processing unit of the computer system at any designated address, even in a case where the central processing unit has an instruction advance reading function. The interrupt address is stored in a register. A comparator outputs a coincidence signal when the interrupt address coincides with the current address supplied to the system memory. At that time, a multiplexer disposed in the system data bus disconnects the central processing unit from the memory and reconnects it via the system data bus to a register in which there has been prestored an interrupt or other instruction.

4 Claims, 4 Drawing Sheets

COMPUTER SYSTEM INCLUDING ADDRESS DRIVEN PROGRAM INTERRUPT SYSTEM

This is a continuation of applications Ser. No. 493,485, filed May 11, 1983, now abandoned.

BACKGROUND OF THE INVENTION

The present invention relates to computer system including a program supervisory device for controlling a data bus of a CPU of a microprocessor or the like of the computer system.

FIG. 1 illustrates a conventionally used program supervisory device of the type mentioned above. In FIG. 1, reference numeral 1 denotes the CPU of a microprocessor or the like, 2 denotes an address bus to which the output of the CPU is applied, 3 denotes a switch or a latch-type register, 4 denotes a data bus to which the output of the register 3 is applied, 5 denotes a comparator for performing address comparison, 6 denotes a signal line for applying the output of the comparator 5 to the CPU 1, 7 denotes a memory in which an operating program and data for the CPU 1 are stored, and 8 denotes a system data bus used for data transfer between the CPU 1 and the memory 7.

The operation of this device will now be described. In order to execute instructions, the CPU 1 first applies an address to the memory 7 through the address bus 2. In an ordinary operation, the memory 7 system outputs an instruction code onto the system data bus in response to a request from the CPU 1. The instruction code then causes the CPU 1 to carry out the corresponding designated operation. The CPU 1 continuously and sequentially carries out such operations.

When it is desired to stop the execution of a program at a specific address, that address is written into the register 3. The address at which program execution is to be halted (hereinafter referred to as a break point address) is applied to the data bus 4. The comparator 5 continuously compares the contents of the address bus 2 and the data bus 4 with each other, and upon the detection of coincidence between the data words on the wo buses, the comparator 5 produces a coincidence signal on the signal line 6 to inform the CPU 1 of the fact of coincidence. Upon the reception of this coincidence signal, the CPU 1 stops the program then under execution.

Arranged in the manner as described above, the conventional program supervisory device as disadvantages in that the addresses of a program being executed by the CPU 1 do not coincide with the addresses used for instruction fetching in the case where the CPU 1 has an instruction advance reading function (for example in an Intel Corp. type M5L8086S microprocessor), hence making it impossible to generate a break point signal at a designated address. Further, even if a software interrupt instruction is issued, it is impossible to rewrite the contents at a designated address of a program in a ROM base, and it is also impossible to stop a program at a desired address.

SUMMARY OF THE INVENTION

The present invention is intended to eliminate the above-mentioned defects in the conventional device. Specifically, an object of the present invention is to provide a program supervisory device in which, when an instruction corresponding to a designated address is fetched, a specific instruction code (such as an interrupt instruction or the like) is placed on the selected data bus, and the CPU then reads and executes the specific instruction code. The fact of completion of the execution of the designated operation is externally communicated.

DESCRIPTION OF THE PREFERRED EMBODIMENTS

Figure 1:
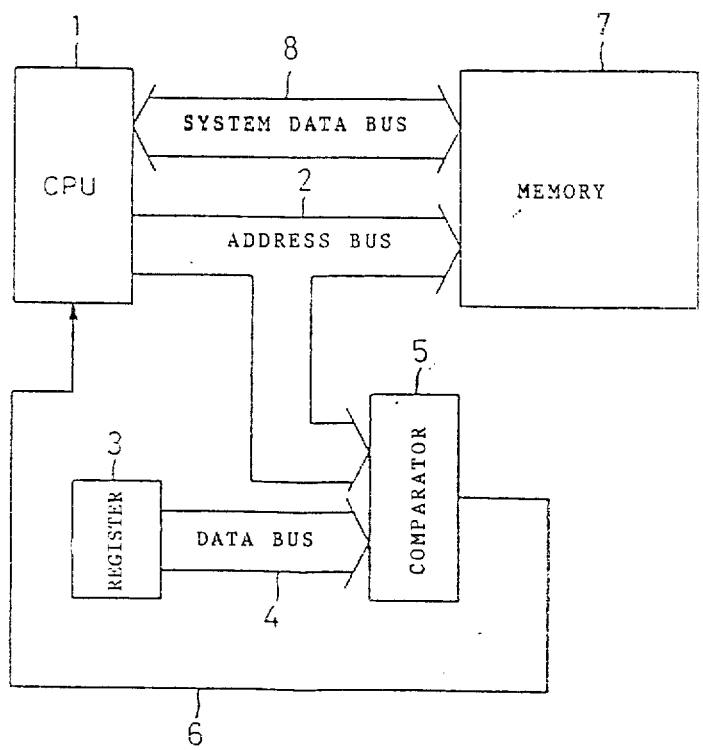
FIG. 1 is a block diagram illustrating a conventional program supervisory device.
Figure 2:
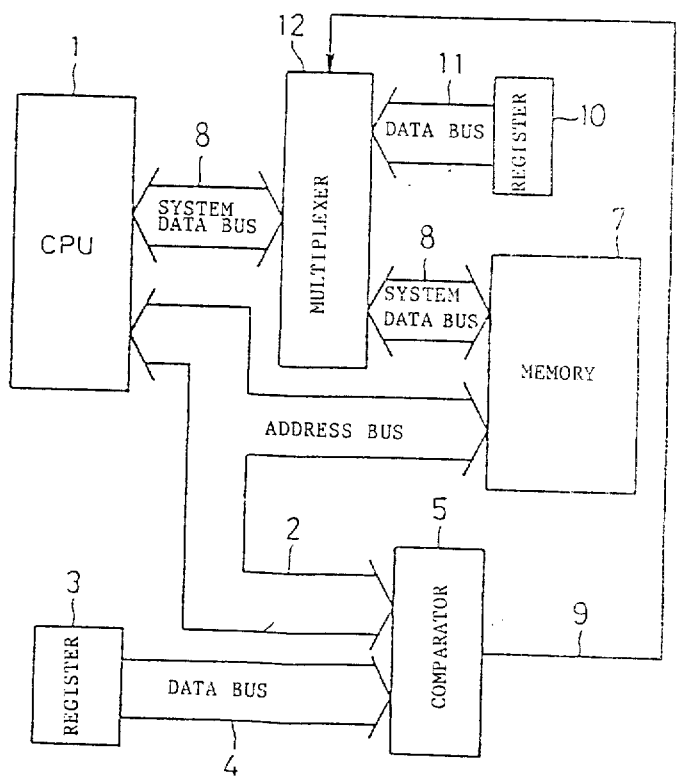
FIG. 2 is a block diagram illustrating a program supervisory device according to a preferred embodiment of the present invention.

FIG. 2 illustrates a preferred embodiment of a computer system including a program supervisory device of the invention. In FIG. 2, reference numerals 1 to 8 denote the same parts as those indicated by like numerals in FIG. 1. The register 3 is used for storing a break point address, and may be a flip-flop device, preferably, a device such as an M74L5373P which can store eight bits simultaneously. The comparator 5 is used for comparing the output of the register 3 and an address bus 2 and producing a coincidence signal when coincidence occurs therebetween, and may preferably be a device such as an M74LS688P which can compare eight bits simultaneously. A memory 7, which is used for storing programs and data and for providing a working area, may be constituted by standard IC memories. A ROM, for example, an M5L2764K, is used for the program area and a RAM, for example, an M58725P, is used for the working and data areas.

Reference numeral 9 denotes a signal line connected to the output of the comparator 5, 10 denotes a register for storing a specified instruction code, 11 denotes a data bus for the output of the register 10, and 12 denotes a multiplexer for switching between the data bus 11 and the system data bus 8 in response to the output signal of the comparator 5. The multiplexer 12 is used for selecting and producing one of a plurality of input lines. The selection can be made by a control signal. The multiplexer 12 may arrange its plural outputs on the same bus and make a selected one of the outputs valid while invalidating the other ones. Thus, only one selected output line may use the bus. Similar to the register 3, the register 10 is provided for storing specified data, and may be a device such as an M74LS373P or, more preferably, a resettable device such as an M74L273P.

The operation of the device thus constructed will now be described. Normally, when the CPU 1 is executing a program, a multiplexer 12 connects the CPU 1 to the memory 7 through the system bus 8 so that the contents of the memory 7 can be fetched by the CPU 1. When a break point is set in the register 3, the comparator 5 continues to compare the content of the address bus 2 with the content of the data bus 4. When the CPU outputs an address equal to the break point address, the content of the address bus 2 will be coincident with the content fo the data bus 4, and hence an address coincidence signal is produced on the output signal line 9 from the comparator 5. Upon the receipt of this signal, the multiplexer 12 changes over the system data bus so as to connect the data bus 11 to the CPU 1. At that time, the CPU 1 receives the content of the register 10 (instruction code) instead of the content of the memory 7.

Thus, the system data bus 8 is changed over for instruction fetching and the break point address is outputted onto the bus, so that even if the break point address is a ROM address, operations are performed as if the program were rewritten. By writing a software interrupt instruction code into the register 10, when the CPU 1 executes the instruction at the break point address, a software interrupt or the like can be carried out, thereby making it possible to communicate externally the fact that the program execution address is equal to the break point address and that an interrupt has occurred.

Figure 3:
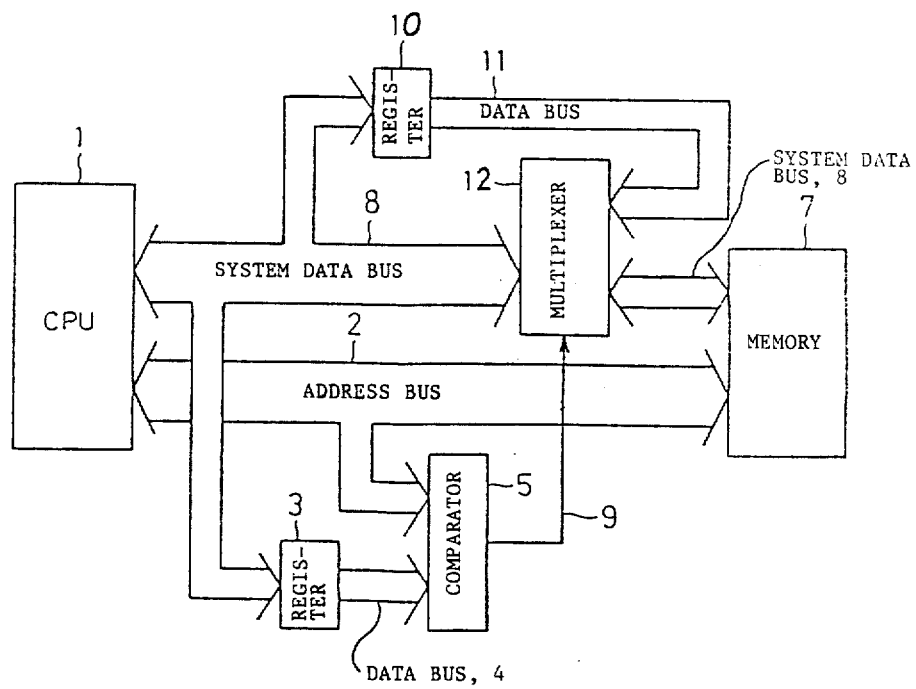
FIG. 3 is a block diagram illustrating a program supervisory device according to another preferred embodiment of the present invention.

Although the setting in the registers 3 and 10 of the break point address and specific instruction code is externally performed in the above-described embodiment, the system data bus may be connected to the register 3 and the multiplexer 12 as shown in FIG. 3 with the same effect as in the above-described embodiment.

Figure 4:
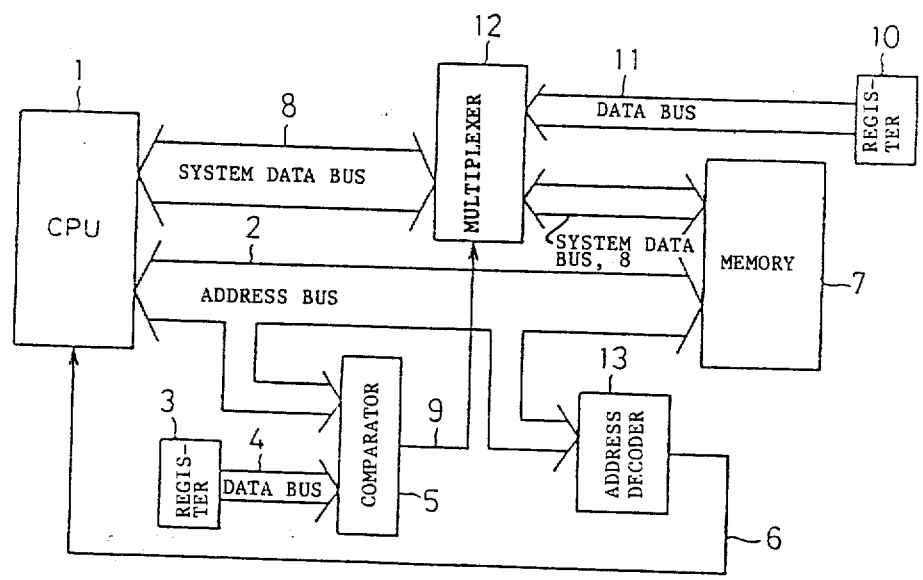
FIG. 4 is a block diagram illustrating a program supervisory device according to a further preferred embodiment of the present invention.

Further, although the instruction code of the register 3 is an interrupt instruction in the first-described embodiment, it may be an I/O instruction or a memory writing instruction, and the device may be arranged such that an address decoder 13 is connected to the address bus 2 as shown in FIG. 4. In the latter case, upon the occurrence of address coincidence, the output of the address decoder 13 will be produced on the signal line 6. The address decoder 13 is provided for determining whether the address value coincides with the designated address and for producing an output upon the occurrence of such coincidence. That is, the address decoder 13 has a function which may be obtained by combining the register 3 and the comparator 5. Usually, however, the comparison value is constant, and therefore in most cases the address decoder can be implemented with a combination of gates without using a register.

As described above, according to the present invention, a program supervisory device is constructed such that, when the content of the break point address of memory is fetched, the system data bus is changed over and the CPU is caused to read in a specific, designated instruction. This device is advantageous in that, even in the case the CPU has an instruction advance reading function, and even in the case that a program in ROM is being performed, the desired interrupt operation will always be properly executed. Moreover, it is not necessary to externally monitor the status of the CPU, the circuit can be easily constructed, and the device can be produced inexpensively.

I claim:

1. A computer system including a program supervisory device, said system comprising:

a central processing unit;

at least two instruction code sources for selectively transmitting instruction codes to said central processing unit;

a system data bus coupled to said central processing unit;

a system address bus coupled to said central processing unit;

said first instruction code source comprising means for storing at least one predetermined instruction code;

said second instruction code source being coupled to said system address bus and comprising a memory for storing therein a plurality of instruction codes at individual addresses thereof, and for supplying instruction codes to said central processing unit over said system data bus in response to addresses supplied from said central processing unit on said system address bus; and means for selectively coupling said central processing unit, via said system data bus, to either (1) said first instruction code source or (2) said second instruction code source, said coupling means including means operatively coupled to said system address bus and responsive only to the addresses carried by said system address bus for generating a signal in response to the appearance on said system address bus of at least one preselected address generated by said central processing unit, and means for selecting a respective instruction code source and for coupling said selected instruction code source to said central processing unit via said system data bus in response to said signal;

said selecting means comprising a multiplexer coupled to said system data bus and receiving as multiplexer inputs the outputs of said first and second instruction code sources; and said signal generating means comprising comparator means for comparing a predetermined interrupt address with addresses placed on said system address bus by said central processing unit, an output of said comparator being applied as a selection control input to said multiplexer.

2. The computer system of claim 1, further comprising register means for storing said predetermined interrupt address.

3. The computer system of claim 2, wherein an input port of said register means is coupled to said system data bus.

4. The computer system of claim 2, further comprising address coincidence detector means having an input port coupled to said system address bus and an output coupled to an interrupt input of said central processing unit, for comparing addresses put on said system address bus by said central processing unit with at least one predetermined address stored in said coincidence detector means, and for generating an interrupt signal on said output in response to the detection of coincidence between the address on said system address bus and said stored address.

* * * * *